US011586951B2

(12) United States Patent
Ito et al.

(10) Patent No.: US 11,586,951 B2
(45) Date of Patent: Feb. 21, 2023

(54) EVALUATION SYSTEM, EVALUATION METHOD, AND EVALUATION PROGRAM FOR EVALUATING A RESULT OF OPTIMIZATION BASED ON PREDICTION

(71) Applicant: NEC CORPORATION, Tokyo (JP)

(72) Inventors: Shinji Ito, Tokyo (JP); Ryohei Fujimaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 333 days.

(21) Appl. No.: 16/761,071

(22) PCT Filed: Aug. 17, 2018

(86) PCT No.: PCT/JP2018/030543
§ 371 (c)(1),
(2) Date: May 1, 2020

(87) PCT Pub. No.: WO2019/087526
PCT Pub. Date: May 9, 2019

(65) Prior Publication Data
US 2021/0182702 A1    Jun. 17, 2021

Related U.S. Application Data

(60) Provisional application No. 62/580,672, filed on Nov. 2, 2017.

(51) Int. Cl.
*G06N 5/04*    (2006.01)
*G06N 20/00*    (2019.01)
(Continued)

(52) U.S. Cl.
CPC ............... *G06N 5/04* (2013.01); *G06N 5/00* (2013.01); *G06N 5/045* (2013.01); *G06N 20/00* (2019.01);
(Continued)

(58) Field of Classification Search
CPC .......... G06Q 10/00–50/00; G06N 3/00–20/00
(Continued)

(56) References Cited

U.S. PATENT DOCUMENTS 7,908,164 B1 * 3/2011 Verma ................ G06Q 30/0202
                                                                  700/106
9,652,722 B1 * 5/2017 Narsky ................... G06N 20/10
(Continued)

FOREIGN PATENT DOCUMENTS

JP    2012-172143 A    9/2012
JP    2016-110591 A    6/2016
(Continued)

OTHER PUBLICATIONS

Bertsimas, Dimitris, et al. "Theory and Applications of Robust Optimization." SIAM Review, vol. 53, No. 3, Oct. 27, 2011, pp. 464-501., doi:10.1137/080734510. (Year: 2010).*

(Continued)

*Primary Examiner* — Alan S Miller
(74) *Attorney, Agent, or Firm* — Sughrue Mion, PLLC (57) ABSTRACT

A learning unit 81 generates a plurality of sample groups from samples to be used for learning, and generates a plurality of prediction models while inhibiting overlapping of a sample group to be used for learning among the generated sample groups. An optimization unit 82 generates an objective function based on an explained variable predicted by the prediction model and based on a constraint condition for optimization, and optimizes a generated objective function. An evaluation unit 83 evaluates an optimization result by using a sample group that has not been used in learning of a prediction model used for generating an objective function targeted for the optimization.

10 Claims, 8 Drawing Sheets

(51) Int. Cl.
*G06Q 30/02* (2012.01)
*G06N 5/00* (2006.01)
*G06Q 30/0201* (2023.01)
*G06N 5/045* (2023.01)
*G06Q 30/0202* (2023.01)

(52) U.S. Cl.
CPC ..... *G06Q 30/0202* (2013.01); *G06Q 30/0206* (2013.01)

(58) Field of Classification Search
USPC ....................................................... 706/1–902
See application file for complete search history.

(56) References Cited

U.S. PATENT DOCUMENTS

| | | | | |
|---|---|---|---|---|
| 2005/0096963 | A1* | 5/2005 | Myr | G06Q 30/0206 705/7.35 |
| 2011/0099136 | A1* | 4/2011 | Barajas | G06F 17/18 706/13 |
| 2014/0109123 | A1* | 4/2014 | Balakrishnan | H04N 21/25435 725/14 |
| 2016/0078361 | A1* | 3/2016 | Brueckner | H04L 67/10 706/12 |
| 2017/0061284 | A1* | 3/2017 | Amano | G06N 5/025 |
| 2019/0018823 | A1* | 1/2019 | Yabe | G06Q 10/04 |
| 2019/0026660 | A1* | 1/2019 | Yabe | G06Q 10/04 |

FOREIGN PATENT DOCUMENTS

| | | |
|---|---|---|
| JP | 2017-530435 A | 10/2017 |
| WO | 2017/094207 A1 | 6/2017 |

OTHER PUBLICATIONS

Campbell R. Harvey et al., "Backtesting", SSRN Electronic Journal, Jul. 28, 2015, 32 pages.
International Search Report for PCT/JP2018/030543 dated Oct. 2, 2018 [PCT/ISA/210].
Communication dated Dec. 22, 2020 from the Japanese Patent Office in Application No. 2019-549880 English Translation.

* cited by examiner

| DATE | PRODUCT A FIXED PRICE | PRODUCT A SELLING PRICE | PRODUCT A SALES VOLUME | PRODUCT B FIXED PRICE | PRODUCT B SELLING PRICE | PRODUCT B SALES VOLUME | PRODUCT C FIXED PRICE | PRODUCT C SELLING PRICE | ... |
|---|---|---|---|---|---|---|---|---|---|
| 2017/7/1 | 1000 | 900 | 450 | 1200 | 960 | 610 | 1000 | 1000 | |
| 2017/7/2 | 1000 | 900 | 460 | 1200 | 960 | 580 | 1000 | 1000 | |
| 2017/7/3 | 1000 | 950 | 300 | 1200 | 1140 | 340 | 1000 | 1000 | |
| 2017/7/4 | 1000 | 950 | 290 | 1200 | 1140 | 325 | 1000 | 1000 | |
| 2017/7/5 | 1000 | 950 | 300 | 1200 | 1140 | 300 | 1000 | 1000 | |
| 2017/7/6 | 1000 | 950 | 250 | 1200 | 1140 | 180 | 1000 | 1000 | |
| ... | | | | | | | | | |

FIG. 3

| | CALENDAR INFORMATION | | | | | | | WEATHER INFORMATION | |
|---|---|---|---|---|---|---|---|---|---|
| | YEAR | MONTH | DAY | DAY OF WEEK | PRESENCE OR ABSENCE OF FLYER | HOLIDAY FLAG | EVENT FLAG | RAINFALL AMOUNT | ... |
| 2017/7/1 | 2017 | 7 | 4 | SAT | 1 | 1 | 0 | 0 | |
| 2017/7/2 | 2017 | 7 | 5 | SUN | 0 | 1 | 1 | 0 | |
| 2017/7/3 | 2017 | 7 | 6 | MON | 0 | 0 | 0 | 1 | |
| 2017/7/4 | 2017 | 7 | 7 | TUE | 0 | 0 | 0 | 5 | |
| 2017/7/5 | 2017 | 7 | 8 | WED | 0 | 0 | 1 | 1 | |
| 2017/7/6 | 2017 | 7 | 9 | THU | 0 | 0 | 0 | 0 | |
| ... | | | | | | | | | |

FIG. 4

| PRICE | PRODUCT A | PRODUCT B | PRODUCT C | ... |
|---|---|---|---|---|
| FIXED PRICE | 1,000 | 1,200 | 1,000 | |
| 95% | 950 | 1,140 | 950 | |
| 90% | 900 | 1,080 | 900 | |
| 85% | 850 | 1,020 | 850 | |
| 80% | 800 | 960 | 800 | |
| ... | | | | |

FIG. 5

[PRODUCT A]

WHEN IT IS NOT HOLIDAY
        - IF WEEK NUMBER < 11    PREDICTION FORMULA 1
        - OTHERWISE    PREDICTION FORMULA 2
        - WHEN IT IS HOLIDAY    PREDICTION FORMULA 3

[PRODUCT B]

WHEN IT IS NOT HOLIDAY
        - IF WEEK NUMBER > 10    PREDICTION FORMULA 4
        ...

FIG. 6

OBJECTIVE FUNCTION $\quad l(p) = \sum_{i=1}^{M} (p_i - c_i)\, q_i(p)$

$l(p)$ : NET PROFIT
$p_i$ : PRODUCT SELLING PRICE
$c_i$ : COST
$q_i$ : PREDICTED SALES VOLUME

CONSTRAINT CONDITION  (PRICE CANDIDATES) $p_i \in \{P_{i1}, P_{i2}, ..., P_{ik}\}$

FIG. 7

TOTAL SALES AMOUNT

SALES AMOUNT FOR EACH PRODUCT

FIG. 8

| OCTOBER | | 1 | 2 | 3 | 4 | 5 | 6 | ... |
|---|---|---|---|---|---|---|---|---|
| | | SUN | MON | TUE | WED | THU | FRI | |
| PRODUCT A | SET SELLING PRICE | 900 | 950 | 950 | 950 | 950 | 950 | |
| | PREDICTED SALES | 240 | 180 | 186 | 189 | 177 | 178.5 | |
| PRODUCT B | SET SELLING PRICE | 960 | 1140 | 1140 | 1140 | 1140 | 1140 | |
| | PREDICTED SALES | 156 | 80 | 100 | 86 | 86 | 86 | |
| PRODUCT C | SET SELLING PRICE | 900 | 950 | 950 | 950 | 950 | 950 | |
| | PREDICTED SALES | 158 | 100 | 112 | 106 | 102 | 102.5 | |
| PRODUCT D | SET SELLING PRICE | 960 | 1,080 | 1,080 | 1,080 | 1,080 | 1,080 | |
| | PREDICTED SALES | 168 | 163 | 167 | 154 | 160 | 152 | |
| ... | SET SELLING PRICE | | | | | | | |
| | PREDICTED SALES | | | | | | | |
| TOTAL SALES AMOUNT [1,000 YEN] | | 1,387 | 1,376 | 1,384 | 1,362 | 1,421 | 1,886 | |

EVALUATION SYSTEM, EVALUATION METHOD, AND EVALUATION PROGRAM FOR EVALUATING A RESULT OF OPTIMIZATION BASED ON PREDICTION

CROSS REFERENCE TO RELATED APPLICATIONS

This application is a National Stage of International Application No. PCT/JP2018/030543 filed Aug. 17, 2018, claiming priority based on U.S. Provisional Application No. 62/580,672, filed on Nov. 2, 2017, the entire disclosure of which is incorporated herein.

TECHNICAL FIELD

The present invention relates to an evaluation system, an evaluation method, and an evaluation program for evaluating a result of optimization based on prediction.

BACKGROUND ART

In recent years, data-driven decision making has received a great deal of attention, and has been used in ninny practical applications. One of the most promising approaches is mathematical optimization based on prediction models generated by machine learning. Recent advances in machine learning have made it easier to create accurate prediction models, and prediction results have been used to build mathematical optimization problems. In the following description, such a problem is referred to as predictive mathematical optimization, or simply as prediction optimization.

These approaches are used in applications where frequent trial and error processes are not practical, such as water distribution optimization, energy generation planning, retail price optimization, supply chain management, and portfolio optimization.

One of the important features of prediction optimization is that, unlike standard optimization, an objective function is estimated by machine learning. For example, in price optimization based on prediction, since future profits are originally unknown, a function for predicting profits is estimated by a regression equation of a demand, as a function of product prices.

PTL 1 discloses an ordering plan determination device that determines an ordering plan for a product. The ordering plan determination device described in PTL 1 calculates a combination of a price and an order quantity of a product for maximizing a profit, by predicting a demand of the product for each price, and using the predicted demand to solve an objective function optimization problem with a price and an order quantity as an input and a profit as an output.

NPL 1 describes a method of determining an appropriate discount for a given Sharpe ratio.

CITATION LIST

Patent Literature

PTL 1: Japanese Patent Application Laid-Open No. 2016-110591

Non Patent Literature

NPL 1: Harvey, Campbell R and Liu, Yan, "Backtesting", SSRN Electronic Journal, 2015

SUMMARY OF INVENTION

Technical Problem

As a specific method of determining a strategy on the basis of prediction, as described in PTL 1, there is means that creates a prediction model on the basis of observed data and calculates an optimal strategy on the basis of the prediction model. At this time, it is important to estimate an effect of the optimized result. One of simple methods for evaluating the effect is a method of estimating an effect of an optimal solution by using a prediction model used for the optimization.

Here, an objective function $f(z, \theta\hat{\,})$ estimated for a (true) objective function $f(z, \theta^*)$ representing the reality itself is assumed. Note that, in the present specification, a superscript $\hat{\,}$ may be described together with a symbol. For example, the superscript $\hat{\,}$ of $\theta$ may be written as $\theta\hat{\,}$.

$z$ and $\theta$ are decision variables, each of which is a parameter of $f$. Further, an estimated optimal strategy is $z\hat{\,}$. That is,

[Formula 1]

$$\hat{z} = \mathrm{argmax}_{z \in Z} f(z, \hat{\theta})$$

is satisfied. Here, $Z$ is a range in which $z$ can move.

In prediction optimization, it is difficult to observe $f(z\hat{\,}, \theta^*)$ because it is necessary to execute the strategy $z\hat{\,}$ in a real environment. Therefore, in order to evaluate a characteristic of $z\hat{\,}$, $f(z\hat{\,}, \theta^*)$ is generally estimated with $f(z\hat{\,}, \theta\hat{\,})$.

However, as described in NPL 1, $f(z\hat{\,}, \theta\hat{\,})$ tends to be highly optimistic in algorithm investment and portfolio optimization. In other words, an optimal value based on estimation is generally biased in an optimistic direction.

According to the description of NPL 1, a general method for evaluating a trading strategy is a simple heuristic method of discounting an estimation target by 50%. That is, in NPL 1, $0.5f(z\hat{\,}, \theta\hat{\,})$ is regarded as an estimator of $f(z, \theta^*)$. Further, recent studies have proposed algorithms that are statistically analyzed and mitigate a problem.

However, these algorithms are limited to specific applications (for example, algorithm investment). Furthermore, in a general prediction optimization problem, there is no principle algorithm for the unbiased estimator of $f(z, \theta^*)$.

Therefore, an object of the present invention is to provide an evaluation system, an evaluation method, and an evaluation system capable of performing an evaluation while suppressing an optimistic bias in prediction optimization.

Solution to Problem

An evaluation system according to the present invention includes: a learning unit that generates a plurality of sample groups from samples to be used for learning, and generates a plurality of prediction models while inhibiting overlapping of a sample group to be used for learning among generated sample groups; an optimization unit that generates an objective function, based on an explained variable predicted by the prediction model and based on a constraint condition for optimization, and optimizes a generated objective function; and an evaluation unit that evaluates an optimization result by using a sample group that has not been used in learning of a prediction model used for generating an objective function targeted for the optimization.

An evaluation method according to the present invention includes: generating a plurality of sample groups from samples to be used for learning; generating a plurality of prediction models while inhibiting overlapping of a sample group to be used for learning among generated sample groups; generating an objective function, based on an explained variable predicted by the prediction model and based on a constraint condition for optimization; optimizing a generated objective function; and evaluating an optimization result by using a sample group that has not been used in learning of a prediction model used for generating an objective function targeted for the optimization.

An evaluation program according to the present invention causes a computer to execute: a learning process of generating a plurality of sample groups from samples to be used for learning, and generating a plurality of prediction models while inhibiting overlapping of a sample group to be used for learning among generated sample groups; an optimization process of generating an objective function, based on an explained variable predicted by the prediction model and based on a constraint condition for optimization, and optimizing a generated objective function; and an evaluation process of evaluating an optimization result by using a sample group that has not been used in learning of a prediction model used for generating an objective function targeted for the optimization.

Advantageous Effects of Invention

According to the present invention, it is possible to perform evaluation while suppressing an optimistic bias in prediction optimization.

DESCRIPTION OF EMBODIMENTS

First, an optimistic bias in an optimal value will be described with use of a specific example. Here, in order to simplify the description, a case will be described in which an expected value of a profit in a coin toss game is estimated. In the coin toss game described here, it is predicted whether a head (H) or a tail (T) will be obtained when tossing a coin, one dollar is earned when the prediction is correct, and nothing is earned when the prediction is incorrect.

Here, when three trials are performed, there are four patterns of (1) three times head (HHH), (2) two times head and one time tail (HHT), (3) one time head and two times tail (HTT), and (4) three times tail (TTT). In these four patterns, probabilities of obtaining the head are estimated to be (1) 1, (2) 2/3, (3) 1/3, and (4) 0, respectively.

Taking into account the probability of obtaining the head in each pattern, it is considered optimal to bet on the head in patterns (1) and (2), and optimal to bet on the tail in the patterns (3) and (4). In betting like this, the expected profit in the pattern of(1) is calculated as 1× $1=$1, the expected profit in the pattern of (2) as 2/3×$1=$0.67, the expected profit in pattern (3) as (1−1/3)× $1=$0.67, and the expected profit in the pattern (4) as (1−0)× $1=$1. If the probability of the head is 1/2, the probabilities of observing these patterns (1), (2), (3), and (4) are 1/8, 3/8, 3/8, and 1/8. Therefore, the expected value of the expected profit in consideration of the optimal solution of these four patterns is calculated as 1×1/8+0.67×3/8+0.67×3/8+1×1/8=$0.75. This is the expected value of the estimated value of the profit when the optimal solution is selected on the basis of prediction.

However, when a coin is tossed, the probability of the head (or tail) is 1/2. Therefore, the expected profit should be 1/2×$1=$0.5. That is, it can be seen that the expected value (0.75 dollars) of the estimated value of the profit when the optimal solution is selected on the basis of prediction contains an optimistic bias as compared with the actual expected profit (0.5 dollars).

Next, a description is given to a reason why $f(\hat{z}, \hat{\theta})$ is not an appropriate estimator of $f(\hat{z}, \theta^*)$ even if $\hat{\theta}$ is an appropriate estimator of $\theta^*$.

Suppose that the objective function $f(z, \hat{\theta})$ is an unbiased estimation amount of a true objective function $f(z, \theta^*)$, that is, the following Equation 1 is satisfied.

[Formula 2]

$$E_x[f(z,\hat{\theta})] = E_x[f(z,\theta^*)], z \in \mathbb{E} \quad \text{(Equation 1)}$$

From an equality relation of the above Equation 1, $E_x[f(\hat{z}, \hat{\theta})]$ and $f(\hat{z}, \hat{\theta})$ each are also considered to be an estimation amount of $E_x[f(\hat{z}, \theta^*)]$ and $f(\hat{z}, \theta^*)$, respectively. However, the following theorem exists.

That is, suppose that Equation 1 is satisfied and $\hat{z}$ and $z^*$ each satisfy the following.

[Formula 3]

$$\hat{z} \in \arg\max_{z \in Z} f(z, \hat{\theta})$$

$$z^* \in \arg\max_{z \in Z} f(z, \theta^*)$$

In this case, the following Equation 2 is satisfied. Further, when there is a possibility that $\hat{z}$ is not optimal for the true objective function $f(z, \theta^*)$, the inequality on the right in Equation 2 is satisfied with an inequality sign.

[Formula 4]

$$E_x[f(\hat{z},\hat{\theta})] \geq f(z^*,\theta^*) \geq E_x[f(\hat{z},\theta^*)] \quad \text{(Equation 2)}$$

This theorem states that even if the estimated objective function $f(z,\hat{\theta})$ is an unbiased estimation amount of the true objective function, an estimated optimal value $f(\hat{z}, \hat{\theta})$ is not the unbiased estimation amount of $f(\hat{z}, \theta^*)$.

This optimistic bias is empirically known in the context of portfolio optimization. For this problem, a bias correction method based on a statistical test has been proposed. However, this is applicable only when the objective function is a Sharpe ratio. However, although these methods are applicable to general prediction optimization problems, they have not been shown to obtain unbiased estimators.

For this problem, the inventor has found a solution based on cross-validation in empirical risk minimization (ERM). Specifically, the inventor has found a method to solve the optimistic bias problem by using an overfitting solution of machine learning.

In supervised machine learning, a learning device determines a prediction rule $\hat{h} \in H$ by minimizing empirical errors. That is, the following Equation 3 is satisfied.
[Formula 5]

$$\hat{h} \in \operatorname{argmin}_{h \in \mathcal{H}} \frac{1}{n} \sum_{n=1}^{N} \ell(h, x_n) \quad \text{(Equation 3)}$$

$x_n$ in Equation 3 is observation data generated from a distribution D, and l is a loss function. The empirical error shown in Equation 4 below
[Formula 6]

$$\frac{1}{N} \sum_{n=1}^{N} \ell(h, x_n) \quad \text{(Equation 4)}$$

is an unbiased estimator of a generalization error for any fixed prediction rule h.
[Formula 7]

$$\ell_{\mathcal{D}}(h) := \mathbb{E}_{x \sim \mathcal{D}}[\ell(h, x)]$$

That is, for any fixed h, the following Equation 5 is satisfied.
[Formula 8]

$$\mathbb{E}_{x_n \sim \mathcal{D}} \left[ \frac{1}{N} \sum_{n=1}^{N} \ell(h, x_n) \right] = \ell_{\mathcal{D}}(h) \quad \text{(Equation 5)}$$

Despite Equation 5 described above, an empirical error in a calculated parameter $\hat{h}$ is in most cases smaller than a generalization error in $\hat{h}$. This is because, as is well known, $\hat{h}$ overfits an observed sample.

In response to this situation, the inventor has found that the cause of the problem of optimistic bias and overfitting in machine learning is reusing of a data set in evaluation of an objective function and evaluation of an objective value.

Table 1 shows a comparison between empirical risk minimization (ERM) and prediction optimization.

TABLE 1

Table 1: Comparison between empirical risk minimization and prediction optimization

|  | Empirical risk minimization | Optimization |
| --- | --- | --- |
| Decision variable | Prediction h | Strategy z |
| True objective function | $\mathbb{E}_{x \sim D}[l(h,x)]$ | $f(z, \theta^*)$ |
| Estimated objective function | $\frac{1}{N} \sum_{n=1}^{N} l(h, x_n)$ | $f(z, \tilde{\theta})$ |

As shown in Table 1, the problem related to prediction optimization bias has a similar structure to the problem of minimizing empirical risk. Typical methods for estimating a generalization error in machine learning are cross-validation and asymptotic bias correction such as Akaike Information Criterion (AIC).

In view of the above, in the present exemplary embodiment, there is generated an unbiased estimator for the value $f(z^\wedge, \theta^*)$ of the true objective function in the calculated strategy. That is, in the present exemplary embodiment, an estimator $\rho(X^n \to R)$ that satisfies Equation 6 below is generated. Note that, in the present exemplary embodiment, an unbiased estimator of $\theta^*$ is assumed as $\hat{\theta}$.
[Formula 9]

$$\mathbb{E}_x[\rho(x)] = \mathbb{E}_x[f(\hat{z}, \theta^*)] \quad \text{(Equation 6)}$$

Based on the above assumption, an exemplary embodiment of the present invention will be described with reference to the drawings. Hereinafter, price optimization based on prediction will be described with reference to specific examples. In an example of price optimization based on prediction, a predicted profit corresponds to an evaluation result.

Figure 1:
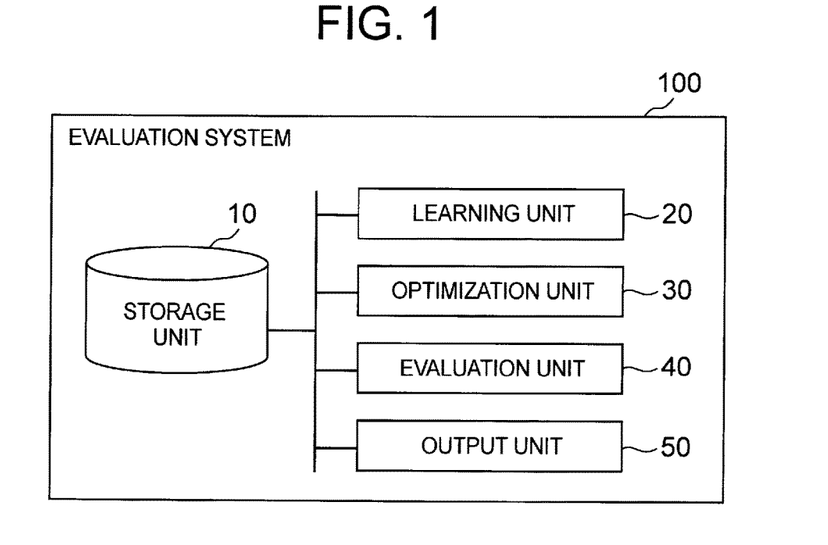
FIG. 1 It depicts a block diagram showing a configuration example of an exemplary embodiment of an evaluation system according to the present invention.

FIG. 1 is a block diagram showing a configuration example of an exemplary embodiment of an evaluation system according to the present invention. An evaluation system 100 of the present exemplary embodiment includes a storage unit 10, a learning unit 20, an optimization unit 30, an evaluation unit 40, and an output unit 50.

The storage unit 10 stores learning data (hereinafter, also referred to as a sample) to be used by the learning unit 20 described later for learning. In a case of the price optimization example, past sales data, prices, and data representing factors affecting sales (hereinafter, also referred to as external factor data) are stored as learning data.

Figure 2:
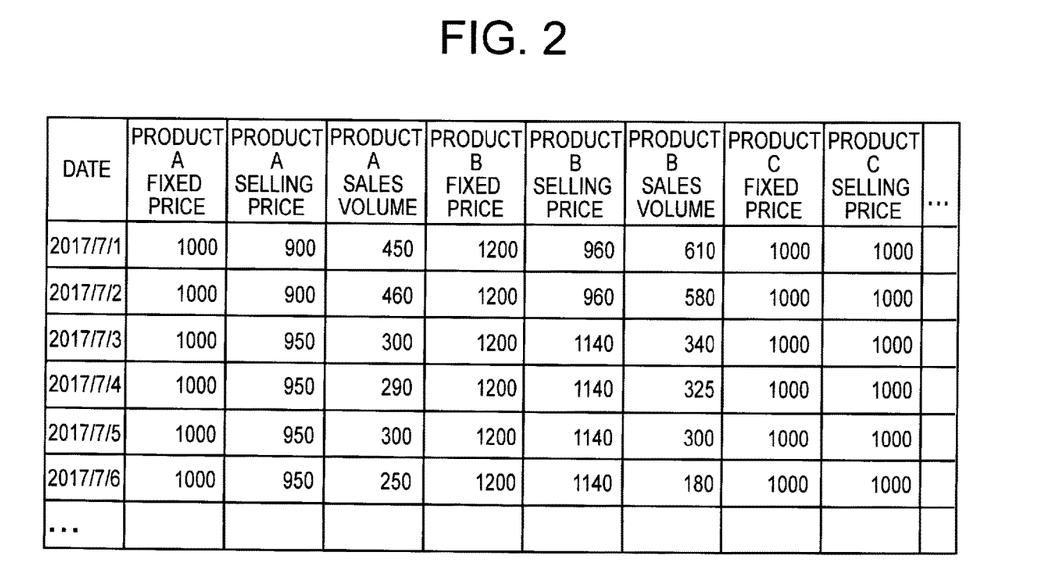
FIG. 2 It depicts an explanatory view showing an example of learning data.

FIG. 2 is an explanatory view showing an example of learning data. The learning data exemplified in FIG. 2 shows an example in which a fixed price of each product, an actually set selling price, and a sales volume of each product are stored for each date.

Figure 3:
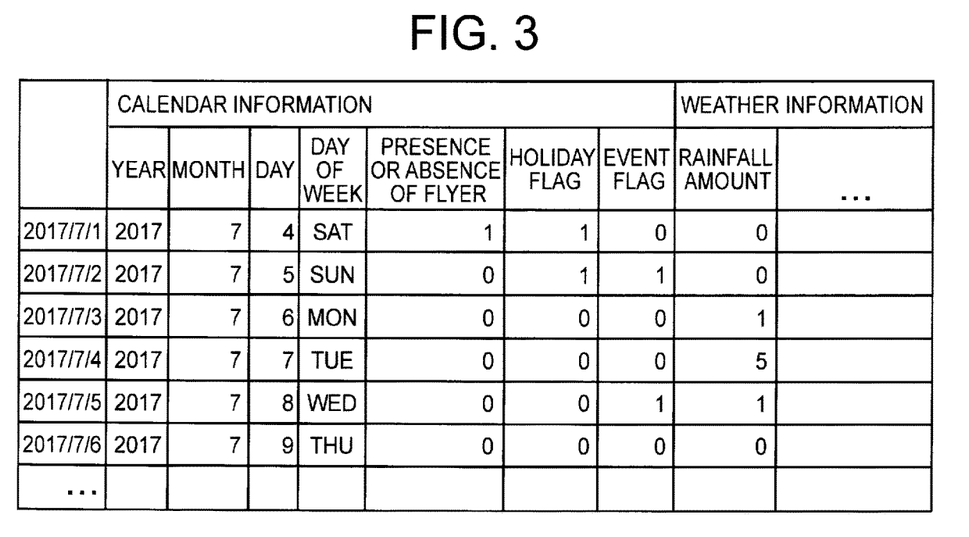
FIG. 3 It depicts an explanatory view showing an example of external factor data.

Further, FIG. 3 is an explanatory view showing an example of external factor data. The external factor data exemplified in FIG. 3 shows an example in which calendar information for each date is stored. Further, as exemplified in FIG. 3, the external factor data nay include data such as a weather information.

Figure 4:
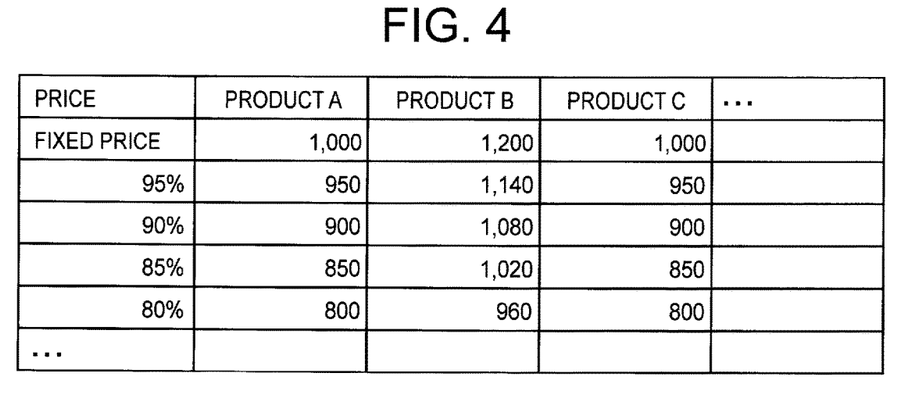
FIG. 4 It depicts an explanatory view showing an example of a constraint condition.

Further, the storage unit 10 stores a constraint condition when the optimization unit 30 described later performs an optimization process. FIG. 4 is an explanatory view showing an example of a constraint condition. The constraint condition exemplified in FIG. 4 indicates that a possible selling price is determined in accordance with a discount rate for a fixed price of each product. The storage unit 10 is realized by, for example, a magnetic disk or the like.

The learning unit 20 generates a prediction model for predicting variables to be used for calculation of optimization. For example, in a case of a price optimization problem for maximizing total sales, sales are calculated as a product of a price and a sales volume. Therefore, the learning unit 20 may generate a prediction model for predicting a sales volume. In the following description, an explanatory variable means a variable that may affect a prediction target. For example, when the prediction target is a sales volume, a selling price and a sales volume of a product in the past, calendar information, and the like correspond to the explanatory variable.

The prediction target is also called "objective variable" in the field of machine learning. Note that, in order to avoid confusion with "objective variable" generally used in an optimization process described below, a variable representing a prediction target will be referred to as an explained variable in the following description. Therefore, the prediction model can be said to be a model in which the explained variable is represented with use of one or more explanatory variables.

Specifically, the learning unit 20 divides a sample to be used for learning to generate a plurality of sample groups. Hereinafter, in order to simplify the description, a description is given to a case where a sample is divided into two sample groups (hereinafter, referred to as a first sample group and a second sample group). However, the number of sample groups to be generated is not limited to two, and may be three or more.

The learning unit 20 generates a prediction model by using the generated sample group. At this time, the learning unit 20 generates a plurality of prediction models while inhibiting overlapping of a sample group to be used for learning among the generated sample groups. For example, when two sample groups are generated, the learning unit 20 uses the first sample group to generate a first prediction model for predicting a sales volume of a product, and uses the second sample group to generate a second prediction model for predicting a sales volume of a product.

Figure 5:
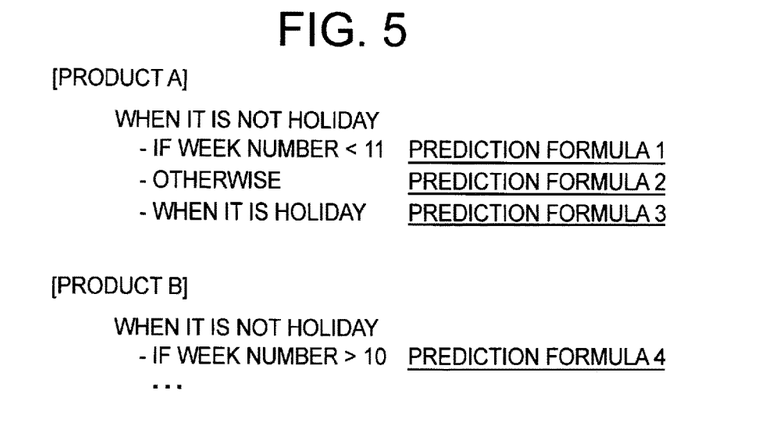
FIG. 5 It depicts an explanatory view showing an example of a prediction model.

Any method may be adopted for the learning unit 20 to generate the prediction model. The learning unit 20 may generate the prediction model by using a machine learning engine such as factorized asymptotic Bayesian inference (FAB). FIG. 5 is an explanatory view showing an example of a prediction model. The prediction model exemplified in FIG. 5 is a prediction model for predicting a sales volume of each product, and a prediction formula is selected in accordance with a content of the explanatory variable.

The optimization unit 30 generates an objective function on the basis of an explained variable predicted by the generated prediction model and a constraint condition of the optimization. Then, the optimization unit 30 optimizes the generated objective function. For example, when two prediction models are generated, the optimization unit 30 generates a first objective function on the basis of an explained variable predicted by the first prediction model, and generates a second objective function on the basis of an explained variable predicted by the second prediction model. Then, the optimization unit 30 optimizes the generated first and second objective functions.

Note that any method may be adopted for the optimization unit 30 to perform the optimization process. For example, in a case of a problem for maximizing expected total sales, the optimization unit 30 generates, as an objective function, a sum of products of a sales volume predicted based on the prediction model and a product price based on the constraint condition exemplified in FIG. 4. Then, the optimization unit 30 may specify a price of a product for maximizing total sales by optimizing the generated objective function.

Figure 6:
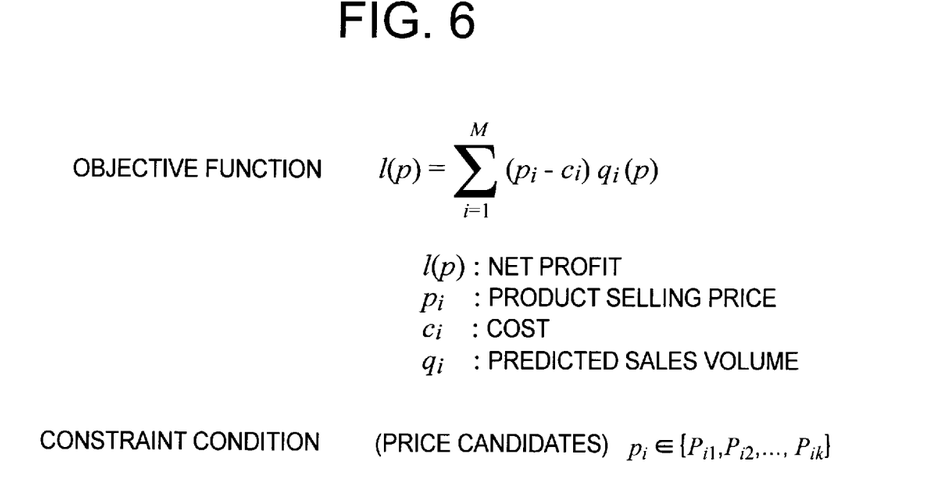
FIG. 6 It depicts an explanatory view showing an example of an optimization problem for maximizing a gross profit.

Note that the optimization target may be a gross profit instead of total sales. FIG. 6 is an explanatory view showing an example of an optimization problem for maximizing a gross profit. The objective function exemplified in FIG. 6 is a function for calculating, as a net profit, a sum obtained by multiplying a difference between a product selling price and a cost by a predicted sales volume. Specifically, the sales volume is predicted by the prediction model learned by the learning unit 20. Then, the optimization unit 30 optimizes the objective function so as to maximize the gross profit on the basis of the constraint condition indicating price candidates exemplified in FIG. 6.

The evaluation unit 40 evaluates a result of optimization performed by the optimization unit 30. Specifically, the evaluation unit 40 specifies a sample group that has not been used for learning of the prediction model, in learning of the prediction model used for generating an objective function targeted for the optimization. Then, the evaluation unit 40 evaluates the optimization result by using the specified sample group.

For example, suppose that the optimization unit 30 generates a first objective function by using a first prediction model learned with use of a first sample group. At this time, the evaluation unit 40 evaluates an optimization result by using a second sample group. Similarly, suppose that the optimization unit 30 generates a second objective function by using a second prediction model learned with use of the second sample group. At this time, the evaluation unit evaluates an optimization result by using the first sample group. For example, in a case of a price optimization problem, the evaluation unit 40 may evaluate an optimization result by calculating a profit on the basis of a specified price.

Further, the evaluation unit 40 may evaluate the optimization result by summing up the optimization result with each objective function. Specifically, the evaluation unit 40 may calculate, as the optimization result, an average of the optimization result with each objective function.

The output unit 50 outputs an optimized result. The output unit 50 may output the optimized result and the evaluation for the result. The output unit 50 may display the optimization result on a display device (not shown) or may store the optimization result in the storage unit 10.

Figure 7:
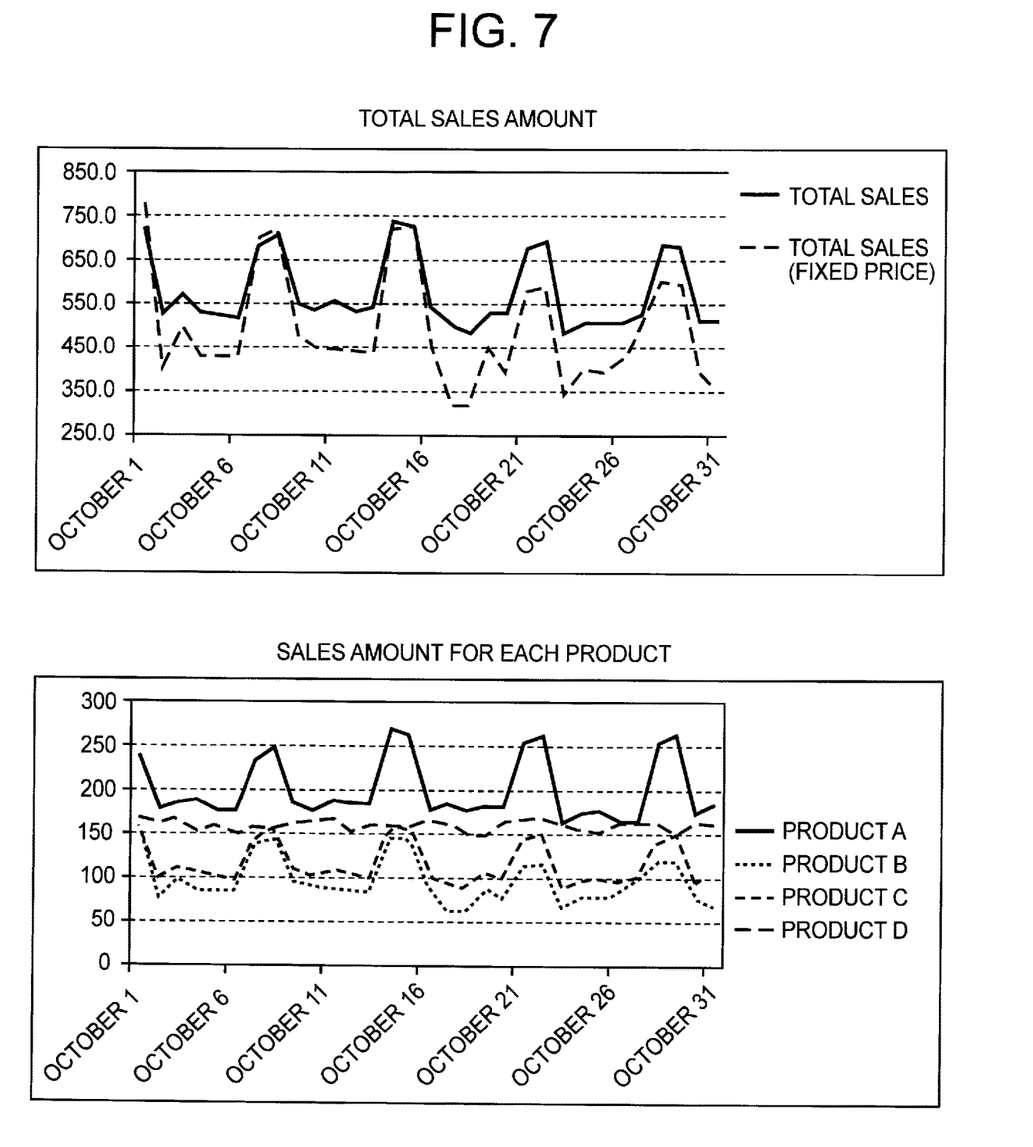
FIG. 7 It depicts an explanatory view showing an example of outputting an evaluation result.
Figure 8:
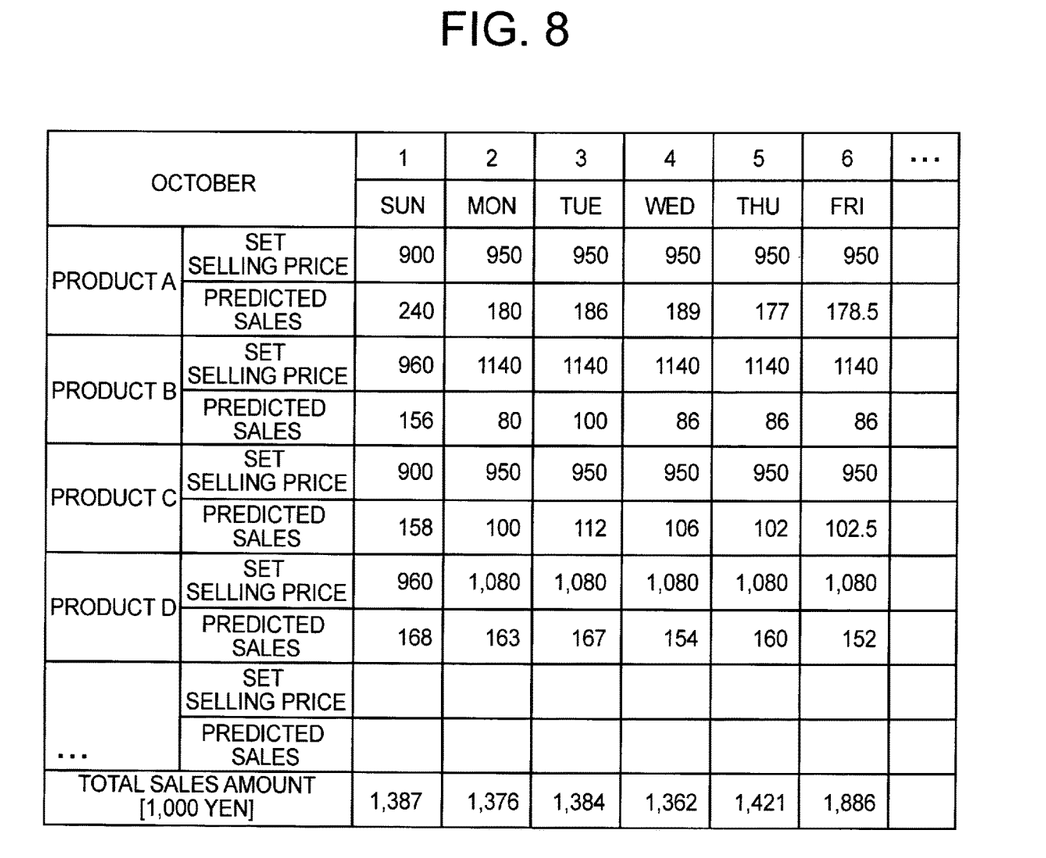
FIG. 8 It depicts an explanatory view showing an example of outputting an evaluation result.

FIGS. 7 and 8 are explanatory views showing an example of outputting an evaluation result. As exemplified in FIG. 7, the output unit 50 may display a sales amount for each product and a total sales amount in a graph format on the basis of the optimization result. Further, as exemplified in FIG. 8, the output unit 50 may display sales prediction for a set selling price in a table format. At that time, the output unit 50 may display a fixed price and a discounted selling price in a distinguishable manner.

The learning unit 20, the optimization unit 30, the evaluation unit 40, and the output unit 50 are realized by a processor (for example, a central processing unit (CPU), a graphics processing unit (GPU), and a field programmable gate array (FPGA)) of a computer that operates in accordance with a program (evaluation program).

The program described above may be stored in, for example, the storage unit 10, and the processor may read the program and operate as the learning unit 20, the optimization unit 30, the evaluation unit 40, and the output unit 50 in accordance with the program. Further, a function of the evaluation system may be provided in a software as a service (SaaS) format.

Each of the learning unit 20, the optimization unit 30, the evaluation unit 40, and the output unit 50 may be realized by dedicated hardware. In addition, part or all of each component of each device may be realized by general purpose or dedicated circuitry, a processor, or the like, or a combination thereof. These may be configured by a single chip or may be configured by a plurality of chips connected via a bus. Part or all of each component of each device may be realized by a combination of the above-described circuitry and the like and a program.

Further, when part or all of each component of the evaluation system is realized by a plurality of information processing apparatuses, circuits, and the like, the plurality of information processing apparatuses, circuits, and the like may be arranged concentratedly or distributedly. For example, the information processing apparatuses, the circuits, and the like may be realized as a form in which each is connected via a communication network, such as a client server system, a cloud computing system, and the like.

Figure 9:
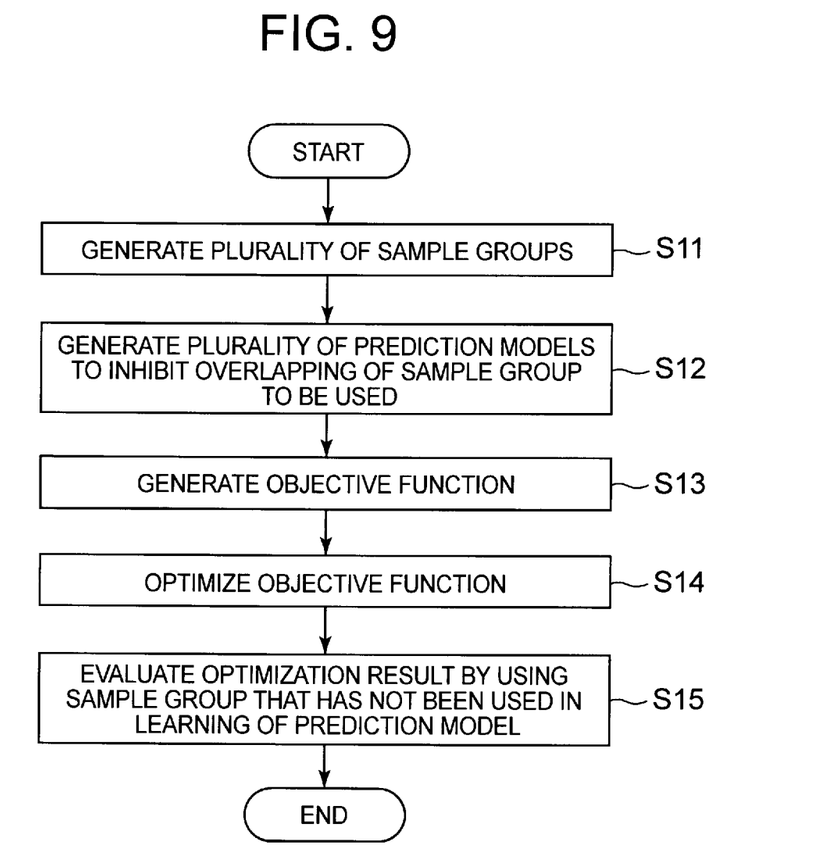
FIG. 9 It depicts a flowchart showing an operation example of the evaluation system.

Next, an operation of the evaluation system of the present exemplary embodiment will be described. FIG. 9 is a flowchart showing an operation example of the evaluation system of the present exemplary embodiment.

The learning unit 20 generates a plurality of sample groups from samples to be used for learning (step S11). Then, the learning unit 20 generates a plurality of prediction models while inhibiting overlapping of a sample group to be used for learning among the generated sample groups (step S12). The optimization unit 30 generates an objective function on the basis of an explained variable predicted by the prediction model and a constraint condition of the optimization (step S13). Then, the optimization unit 30 optimizes the generated objective function (step S14). The evaluation unit 40 evaluates the optimization result by using a sample group that has not been used in learning of the prediction model (step S15).

As described above, in the present exemplary embodiment, the learning unit 20 generates a plurality of sample groups, and generates a plurality of prediction models while inhibiting overlapping of a sample group to be used for learning. Further, the optimization unit generates and optimizes an objective function on the basis of an explained variable (prediction target) predicted by the prediction model and a constraint condition for the optimization. Then, the evaluation unit 40 evaluates the optimization result by using a sample group that has not been used in learning of the prediction model. Therefore, it is possible to perform evaluation while suppressing an optimistic bias in prediction optimization.

Hereinafter, a description is given to a reason why the estimation system of the present exemplary embodiment generates an unbiased estimator. In the context of algorithm investment, a method called a holdout method is known. The following description can also essentially be said as an extension of the holdout method for general prediction optimization problems.

One reason that the value $f(z^{\wedge}, \theta^{\wedge})$ includes a bias is that $z^{\wedge}$ and $\theta^{\wedge}$ are dependent random variables. In fact, when $z^{\wedge}$ and $\theta^{\wedge}$ are independent, then a relationship of Equation 7 shown below is satisfied directly from the assumption that $\theta^{\wedge}$ is an unbiased estimator of $\theta^*$.

[Formula 10]

$$\mathbb{E}_x[f(\hat{z},\hat{\theta})] = \mathbb{E}_x[f(\hat{z},\theta^*)] \quad \text{(Equation 7)}$$

The main idea of a cross-validation method (as a standard cross-validation in machine learning) is to divide data $x \in X^N$ into two parts $x_1 \in X^{N1}$, $x_2 \in X^{N2}$, where $N_1+N_2=N$. Note that $x_1$ and $x_2$ are independent random variables since each element in $x_1$ and $x_2$ independently follows p. Hereinafter, an estimator based on $x_1$ is referred to as $\theta_1^{\wedge}$, and an estimator based on $x_2$ is referred to as $\theta_2^{\wedge}$.

Further, an optimal strategy based on each estimator is expressed by the following Equation 8.

[Formula 11]

$$\hat{z}_i := \operatorname{argmax}_{z \in Z} f(z, \hat{\theta}_i) \quad \text{(Equation 8)}$$

At this time, $z_1^{\wedge}$ and $\theta_2^{\wedge}$ are independent, and $x_2^{\wedge}$ and $\theta_1^{\wedge}$ are also independent. Therefore, the following Equation 9 is satisfied.

[Formula 12]

$$\mathbb{E}_x[f(\hat{z}_1,\hat{\theta}_2)] = \mathbb{E}_{x_1}[f(\hat{z}_1, \mathbb{E}_{x_2}[\hat{\theta}_2])] = \mathbb{E}_{x_1}[f(\hat{z}_1, \theta^*)] \quad \text{(Equation 9)}$$

Furthermore, when $N_1$ is large enough,

[Formula 13]

$$\mathbb{E}_{x_1}[f(\hat{z}_1,\hat{\theta}^*)]$$

becomes closer to

[Formula 14]

$$\mathbb{E}_x[f(\hat{z},\hat{\theta}^*)]$$

This idea can be extended to k-cross validation, which divides data x into K parts.

$z_k^{\sim}$ is calculated from $\{x_1, \ldots, x_K\}\backslash\{x_k\}$, and $\theta_k^{\wedge}$ is calculated from $x_k$. At this time, a value $CV_K$ shown in the following Equation 10 satisfies the following Equation 11. $z^{\sim}$ in Equation 11 represents a strategy calculated from $(K-1)$ N' pieces of sample.

[Formula 15]

$$CV_K := 1/K \Sigma_{j=1}^K f(\tilde{z}_k, \hat{\theta}_k) \quad \text{(Equation 10)}$$

$$\mathbb{E}_x[CV_k] = \mathbb{E}_{x'}[f(\tilde{z},\theta^*)] \quad \text{(Equation 11)}$$

Figure 10:
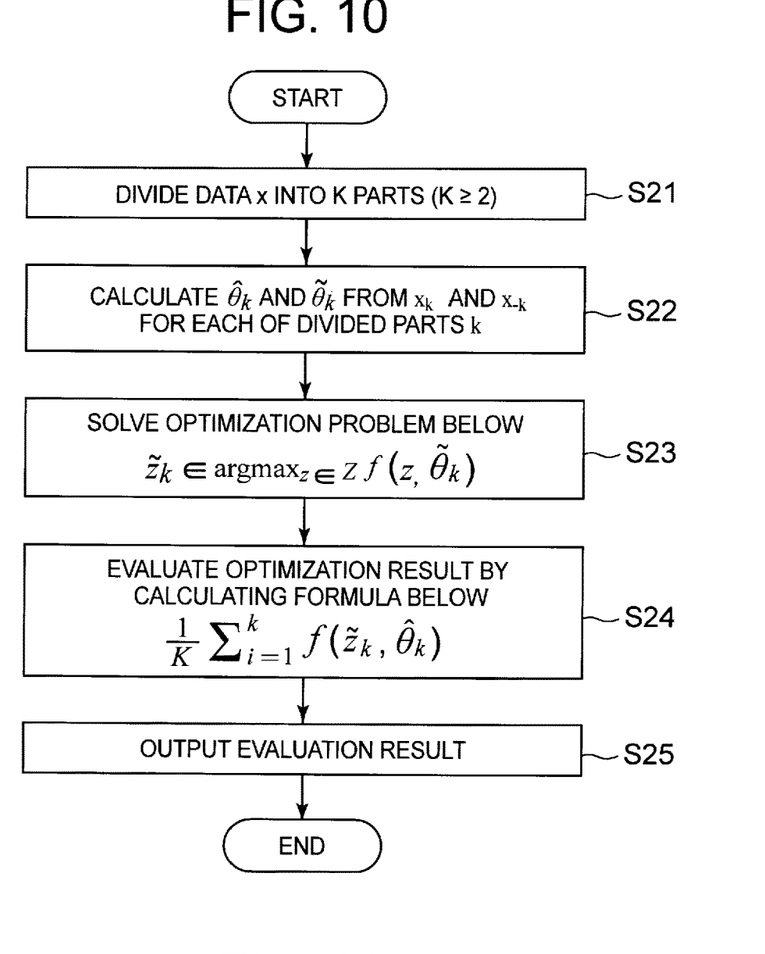
FIG. 10 It depicts a flowchart showing an example of an algorithm for generating an estimator.

FIG. 10 is a flowchart showing an example of an algorithm for generating an estimator $f(z^{\sim}, \theta^*)$. First, the learning unit 20 divides the data $x \in X^N$ into K parts $x_1, \ldots, x_K$ (where $K \geq 2$) (step S21). Next, when $x_{-k}$ is defined as all samples of x except $x_{k+}$ the learning unit 20 calculates $\theta_k^{\wedge}$ and $\theta_k^{\sim}$ from $x_k$ and $x_{-k}$ for each of the divided parts k (step S22). The optimization unit 30 solves an optimization problem represented by the following Equation 12 (step S23).

[Formula 16]

$$\tilde{z}_k \in \operatorname{argmax}_{z \in Z} f(z, \hat{\theta}_k) \quad \text{(Equation 12)}$$

Then, the evaluation unit 40 evaluates the optimization result by calculating Equation 13 shown below (step S24), and the output unit 50 outputs the evaluation result (step S25).

[Formula 17]

$$\frac{1}{K}\sum_{i=1}^{k} f(\tilde{z}_k, \hat{\theta}_k) \quad \text{(Equation 13)}$$

That is, Equation 14 shown below is calculated by the algorithm exemplified in FIG. 10. This corresponds to Equation 6 above.

[Formula 18]

$$pcv(x) = \frac{1}{K}\sum_{i=1}^{k} f(\tilde{z}_k, \hat{\theta}_k) \quad \text{(Equation 14)}$$

Figure 11:
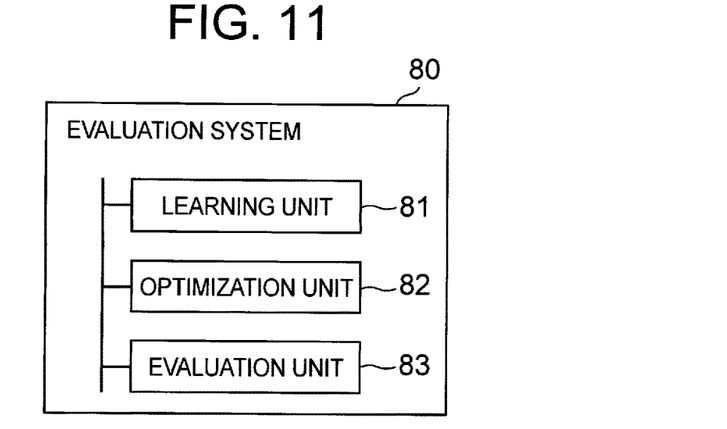
FIG. 11 It depicts a block diagram showing an outline of the evaluation system of the present invention.

Next, an outline of the present invention will be described. FIG. 11 is a block diagram showing an outline of the evaluation system of the present invention. An evaluation system 80 according to the present invention includes: a learning unit 81 (for example, the learning unit 20) that generates a plurality of sample groups from samples to be used for learning, and generates a plurality of prediction models while inhibiting overlapping of a sample group to be used for learning among generated sample groups: an optimization unit 82 (for example, the optimization unit 30) that generates an objective function, based on an explained variable predicted by the prediction model and based on a constraint condition for optimization, and optimizes a generated objective function; and an evaluation unit 83 (for example, the evaluation unit 40) that evaluates an optimization result by using a sample group that has not been used in learning of a prediction model used for generating an objective function targeted for the optimization.

Such a configuration makes it possible to perform an evaluation while suppressing an optimistic bias in prediction optimization.

Further, the optimization unit 82 may generate an objective function on the basis of each generated prediction model, and optimize each generated objective function. Then, the evaluation unit 83 may evaluate the optimization result by summing up the optimization result with each objective function.

Specifically, the evaluation unit 83 may calculate, as the optimization result, an average of the optimization result with each objective function.

Further, the learning unit 81 may generate two sample groups from samples to be used for learning, generate a first prediction model by using a first sample group, and generate a second prediction model by using a second sample group. Further, the optimization unit 82 may generate a first objective function on the basis of an explained variable predicted by the first prediction model, generate a second objective function on the basis of an explained variable predicted by the second prediction model, and optimize the generated first and second objective functions. Then, the evaluation unit 83 may evaluate the optimization result of the first objective function by using the second sample group, and evaluate the optimization result of the second objective function by using the first sample group.

Specifically, the learning unit 81 may generate a plurality of prediction models for predicting a sales volume of a product. Further, the optimization unit 82 may generate an objective function for calculating sales on the basis of a sales volume based on the prediction model and a selling price of the product, and specify a price of a product for maximizing total sales by optimizing the generated objective function. Then, the evaluation unit 83 may evaluate the optimization result by calculating a profit on the basis of the specified price.

At that time, the optimization unit 82 may generate an objective function using a possible selling price of each product as a constraint condition.

Figure 12:
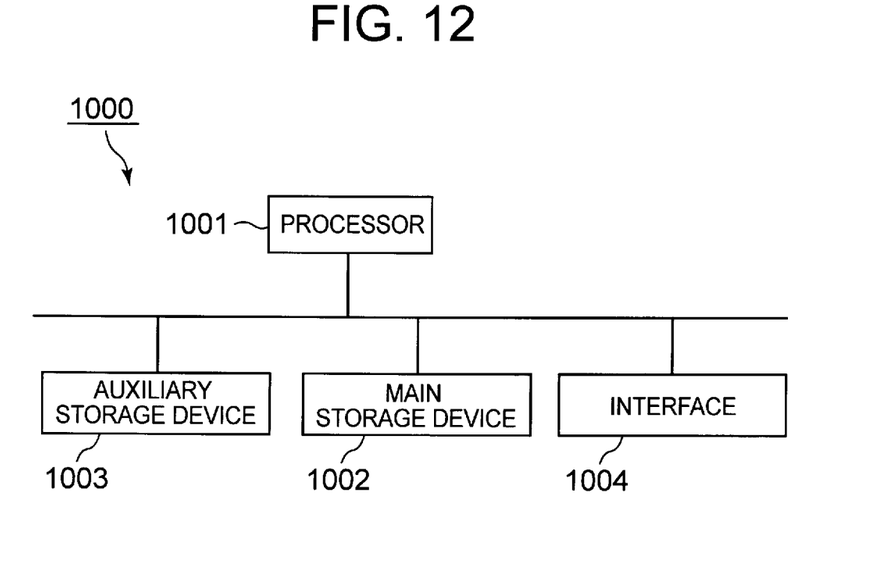
FIG. 12 It depicts a schematic block diagram showing a configuration of a computer according to at least one exemplary embodiment.

FIG. 12 is a schematic block diagram showing a configuration of a computer according to an exemplary embodiment of the present invention. A computer 1000 includes a processor 1001, a main storage device 1002, an auxiliary storage device 1003, and an interface 1004.

The evaluation system described above is implemented in the computer 1000. Then, an operation of each processing unit described above is stored in the auxiliary storage device 1003 in a form of a program (evaluation program). The processor 1001 reads out the program from the auxiliary storage device 1003, develops the program in the main storage device 1002, and executes the above processing in accordance with the program.

Note that, in at least one exemplary embodiment, the auxiliary storage device 1003 is an example of a non-transitory tangible medium. Other examples of the non-transitory tangible medium include a magnetic disk, a magneto-optical disk, a CD-ROM, a DVD-ROM, a semiconductor memory, and the like, connected via the interface 1004. Further, in a case where this program is distributed to the computer 1000 by a communication line, the computer 1000 that has received the distribution may develop the program in the main storage device 1002 and execute the above processing.

Further, the program may be for realizing some of the functions described above. Further, the program may be a program that realizes the above-described functions in combination with another program already stored in the auxiliary storage device 1003, that is, a so-called difference file (difference program).

Although the present invention has been described with reference to the exemplary embodiment and examples, the present invention is not limited to the above exemplary embodiment and examples. Various changes that can be understood by those skilled in the art can be made to the configuration and details of the present invention within the scope of the present invention.

The invention claimed is:

1. An evaluation system comprising:
a hardware processor configured to execute a software code to:
generate a plurality of sample groups from samples to be used for learning stored in a storage, and learn a plurality of prediction models while inhibiting overlapping of a sample group to be used for learning among generated sample groups;
optimize an objective function generated based on an explained variable predicted by each of the prediction models and based on a constraint condition for optimization using an optimization processor that performs an optimization process for an objective function expressed as a sum of products of a sales volume and a product price; and
evaluate a result of the optimization by using a sample group that has not been used in learning of a prediction model used for generating an objective function targeted for the optimization using an evaluation processor that calculates $1\Sigma_{i=1}^{k} f(\tilde{z}_k, \hat{\theta}_k)$ where f is an estimator, K is the number of divided sample groups, k is each part of the divided sample group, $\tilde{z}_k$ is a strategy calculated from each divided sample group, and $\hat{\theta}_k$ is an estimator based on each divided sample group.

2. The evaluation system according to claim 1, wherein the hardware processor is configured to execute a software code to:
generate an objective function based on each generated prediction model, and optimize each generated objective function, and evaluate a result of optimization by summing up a result of optimization with each objective function.

3. The evaluation system according to claim 2, wherein the hardware processor is configured to execute a software code to:
calculate, as a result of optimization, an average of a result of optimization with each objective function.

4. The evaluation system according to claim 1, wherein the hardware processor is configured to execute a software code to:
generate two sample groups from samples to be used for learning, generate a first prediction model by using a first sample group, and generates a second prediction model by using a second sample group,
generate a first objective function based on an explained variable predicted by the first prediction model, generates a second objective function based on an explained variable predicted by the second prediction model, and optimize the generated first and second objective functions, and
evaluate a result of optimization of the first objective function by using the second sample group, and evaluate a result of optimization of the second objective function by using the first sample group.

5. The evaluation system according to claim 1, wherein the hardware processor is configured to execute a software code to:
generate a plurality of prediction models for predicting a sales volume of a product,
generate an objective function for calculating sales based on a sales volume based on each of the prediction model and a selling price of the product, and specify a price of a product for maximizing total sales by optimizing a generated objective function, and
evaluate a result of the optimization by calculating a profit based on a specified price.

6. The evaluation system according to claim 5, wherein the hardware processor is configured to execute a software code to:
generate an objective function using a possible selling price of each product as a constraint condition.

7. An evaluation method comprising:
generating a plurality of sample groups from samples to be used for learning stored in a storage;
learning a plurality of prediction models while inhibiting overlapping of a sample group to be used for learning among generated sample groups;
optimizing an objective function generated based on an explained variable predicted by each of the prediction models and based on a constraint condition for optimization using an optimization processor that performs an optimization process for an objective function expressed as a sum of products of a sales volume and a product price; and
evaluating a result of the optimization by using a sample group that has not been used in learning of a prediction model used for generating an objective function targeted for the optimization using an evaluation processor that calculates $1/K\Sigma_{i=1}^{k} f(\tilde{z}_k, \hat{\theta}_k)$, where f is an estimator, K is the number of divided sample groups, k is each part of the divided sample group, $\tilde{z}_k$ is a strategy calculated from each divided sample group, and $\hat{\theta}_k$ is an estimator based on each divided sample group.

8. The evaluation method according to claim 7, further comprising:
generating an objective function based on each generated prediction model, and optimizing each generated objective function; and
evaluating a result of optimization by summing up a result of optimization with each objective function.

9. A non-transitory computer readable information recording medium storing an evaluation program, when executed by a processor, that performs a method for:
generating a plurality of sample groups from samples to be used for learning stored in a storage;
learning a plurality of prediction models while inhibiting overlapping of a sample group to be used for learning among generated sample groups;
optimizing a generated objective function generated based on an explained variable predicted by each of the prediction models and based on a constraint condition for optimization using an optimization processor that performs an optimization process for an objective function expressed as a sum of products of a sales volume and a product price; and
evaluating a result of the optimization by using a sample group that has not been used in learning of a prediction model used for generating an objective function targeted for the optimization using an evaluation processor that calculates $1/K=\Sigma_{i=1}^{k} f(\tilde{z}_k, \hat{\theta}_k)$, where f is an estimator, K is the number of divided sample groups, k is each part of the divided sample group, $\tilde{z}_k$ is a strategy calculated from each divided sample group, and $\hat{\theta}_k$ is an estimator based on each divided sample group.

10. The non-transitory computer readable information recording medium according to claim 9, further comprising:
generating an objective function based on each generated prediction model, and optimize each generated objective function; and
evaluating a result of optimization by summing up a result of optimization with each objective function.

* * * * *